United States Patent
Ogino et al.

(10) Patent No.: US 7,323,055 B2
(45) Date of Patent: Jan. 29, 2008

(54) EXTRUSION HEAD FOR EXTRUDING A HIGH VISCOUS MELTING COVERING ELEMENT OF A COVERED CORE WIRE

(75) Inventors: Hiroyuki Ogino, Nara (JP); Shigeki Ueda, Nara (JP); Hiroshi Fukuda, Nara (JP); Tooru Sugimori, Nara (JP); Mitsuo Ebisawa, Kyoto (JP)

(73) Assignee: Matsushita Electric Industrial Co., Ltd., Osaka (JP)

( * ) Notice: Subject to any disclaimer, the term of this patent is extended or adjusted under 35 U.S.C. 154(b) by 548 days.

(21) Appl. No.: 10/352,455

(22) Filed: Jan. 28, 2003

(65) Prior Publication Data

US 2003/0152658 A1  Aug. 14, 2003

(30) Foreign Application Priority Data

Jan. 29, 2002  (JP) ............... P. 2002-019672
Mar. 12, 2002  (JP) ............... P. 2002-067104

(51) Int. Cl.
  *B05C 11/02* (2006.01)
(52) U.S. Cl. ............... 118/125; 118/420; 118/DIG. 18
(58) Field of Classification Search ............... 118/125, 118/420, DIG. 18, 405; 425/113, 461, 378.2, 425/464, 376.1
  See application file for complete search history.

(56) References Cited

U.S. PATENT DOCUMENTS

| 1,553,362 | A | * | 9/1925 | Calcutt ............... 264/171.2 |
| 2,569,541 | A | * | 10/1951 | Selby ............... 524/322 |
| 4,130,676 | A | * | 12/1978 | Ichiyanagi et al. ............... 427/358 |
| 4,152,076 | A | * | 5/1979 | Driskill ............... 366/79 |
| 4,778,367 | A | * | 10/1988 | Hilakos ............... 425/113 |
| 4,864,964 | A | * | 9/1989 | Hilakos ............... 118/117 |
| 5,002,712 | A | * | 3/1991 | Goldmann et al. ..... 264/171.13 |
| 5,176,775 | A | * | 1/1993 | Montsinger ............... 156/181 |
| 6,190,586 | B1 | * | 2/2001 | Abrams et al. ............... 264/40.5 |
| 2002/0041049 | A1 | * | 4/2002 | McCullough ............... 264/136 |

FOREIGN PATENT DOCUMENTS

| JP | 59-109338 | 6/1984 |
| JP | 59-169924 | 11/1984 |
| JP | 62-58822 | 4/1987 |
| JP | 63-260421 | 10/1988 |
| JP | 2001-315532 | 11/2001 |

* cited by examiner

*Primary Examiner*—Brenda A. Lamb
(74) *Attorney, Agent, or Firm*—Pearne & Gordon LLP

(57) ABSTRACT

There is provided an extrusion head that is capable of largely increasing a production speed rather than a conventional head that extrudes supplies a high viscous melt-coating composition. In an extrusion head 12 that comprises a die ring 12 having an exit portion 122 and a nipple 13 arranged in vicinity of the exit portion 122, whereby a core wire passage 131 is provided to an inside of the nipple 13 in an axial direction, and a high viscous melt-coating composition is pressure-fed into a space, which is formed by the die ring 12 and the nipple 13, toward the exit portion 122 while drawing out a core wire W from the core wire passage to the exit portion, and thus a cord-like coated core wire is extruded from the exit portion 122 of the die ring while coating the core wire W with the high viscous melt-coating composition, a stagnation reservoir of the high viscous melt-coating composition is provided in vicinity of the exit portion by providing a wall surface 121 perpendicularly to a proceeding direction of the core wire W at the exit portion 122.

4 Claims, 5 Drawing Sheets

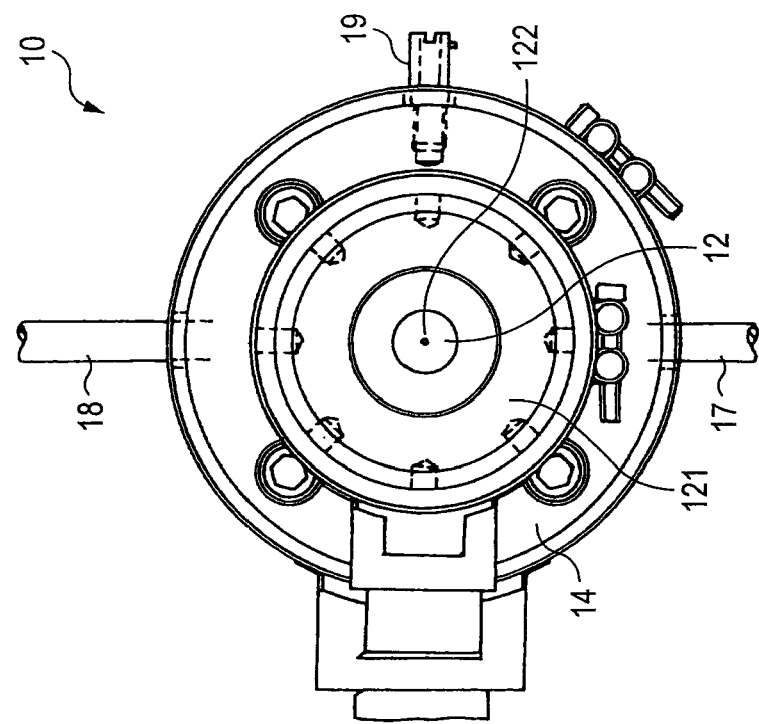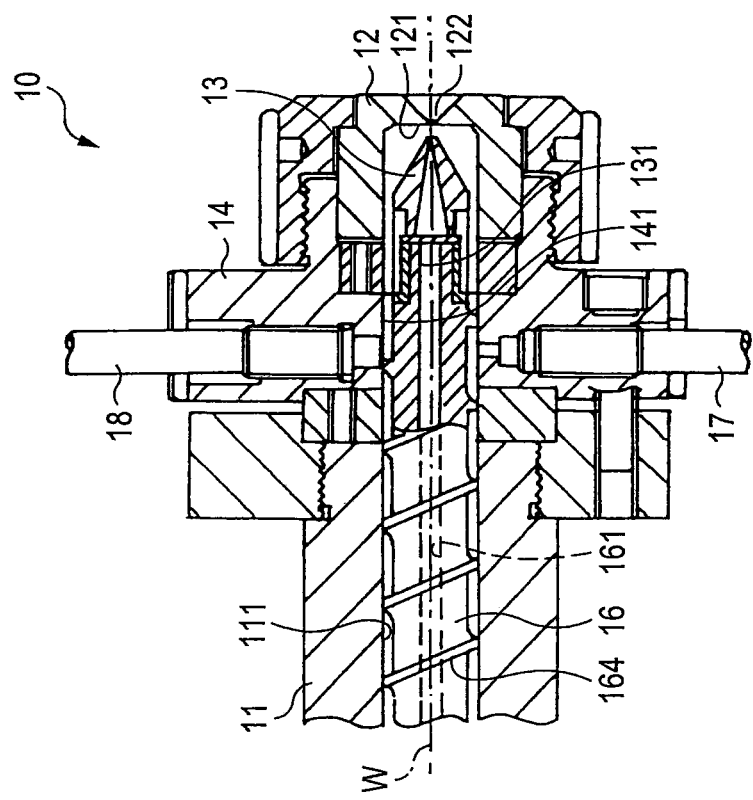

EXTRUSION HEAD FOR EXTRUDING A HIGH VISCOUS MELTING COVERING ELEMENT OF A COVERED CORE WIRE

BACKGROUND OF THE INVENTION

The present invention relates to wire coating extrusion and, more particularly, an extrusion head for a core wire coated with a high viscous melt-coating composition, which is constructed by extruding the high viscous material such as piezoelectric material round the core wire.

A piezoelectric material is such a material that generates a voltage when a vibration is applied, and the piezoelectric ceramic and the polymer piezoelectric material are well known. The ceramic made of lead titanate zirconate, or the like is present as the former, and the monoaxial stretching polyvinylidene fluoride (PVDF), or the like is present as the latter. As the apparatus that utilizes this characteristic, the cord-like pressure-sensitive sensor is known. This cord-like pressure-sensitive sensor is a soft, long and narrow cord having a diameter of about 2.5 mm. This sensor is built around the power window of the car to prevent the accident, or built on the outer periphery of the automatic guided vehicle that runs about in the factory, the warehouse, or the hospital, otherwise this sensor is built on the fence, which is put around the site boundary, to sense the burglary. This sensor is convenient because such sensor can output a pressure change at the concerned portion as an electric signal, no matter which portion of this long and narrow cord is folded or no matter which portion of this cord is lightly touched by the foreign matter.

A structure of the cord-like pressure-sensitive sensor using the coated core wire as an object of the present invention is shown in FIG. 4.

In FIG. 4, 40 is a cord-like pressure-sensitive sensor. This sensor is constructed by coating a piezoelectric material 42 on a core wire (core electrode) 41 that extends in the axial direction, then winding a shield electrode 43 round the piezoelectric material 42, and then coating the outermost periphery with PVC (polyvinyl chloride resin) 44. The present invention is subjected to an extrusion head used to coat the piezoelectric material 42 round the core wire 41.

The cord-like pressure-sensitive sensor 40 employs a resin material having a heat resistance, which permits the use up to the operating temperature of 120° C., as a composite piezoelectric material. Thus, this sensor can be used in a higher temperature range (120° C. or less) than 90° C. that is the highest operating temperature of the polymer piezoelectric material (monoaxial stretching polyvinylidene fluoride) or the composite piezoelectric material (composite piezoelectric material consisting of chloroprene and piezoelectric ceramic powders), which are typical in the conventional art. The composite piezoelectric material consists of the resin having the flexibility and the piezoelectric ceramic, and also the flexible electrode consisting of the coil-like metal core electrode and the film-like outer electrode is employed. Thus, this sensor has the flexibility equivalent to the normal vinyl cord.

In addition, the cord-like pressure-sensitive sensor 40 has a high sensitivity equivalent to the polymer piezoelectric material, and particularly has the high sensitivity equivalent to the polymer piezoelectric material in a low frequency range (10 Hz or less) in which the catch of the human body is sensed. This is because the relative dielectric constant (about 55) of this composite piezoelectric material is larger than the polymer piezoelectric material (about 10) and thus reduction in the sensitivity in the low frequency range (10 Hz or less) is small.

The high heat-resistant composite piezoelectric material (piezoelectric material consisting of two different materials) is formed of the composite material that consists of the resin material and the piezoelectric ceramic powders whose size is 10 μm or less. The vibration sensing characteristic is implemented by the ceramic, and also the flexibility is implemented by the resin. Since noncrystalline polyethylene resin (molecular weight about 300,000) and noncrystalline polyethylene resin (molecular weight about 100,000) are compounded as the resin material, this composite piezoelectric material makes it possible to attain not only the high heat-resistance (120° C.) and the flexibility, which brings about the easy formation, but also simple manufacturing steps in which the bridging is not required.

The cord-like pressure-sensitive sensor 40 obtained in this manner does not have piezoelectric performance just after the piezoelectric material is molded. Therefore, the process of providing the piezoelectric performance to the piezoelectric material (polarizing process) must be executed by applying a DC high voltage of several kV/mm to the piezoelectric material. This polarizing process is executed by applying the DC high voltage to both electrodes after electrodes are formed on both sides of the composite piezoelectric material. If a minute defect such as a crack, or the like is present in the composite piezoelectric material, the short-circuit between both electrodes is ready to occur due to the discharge caused at the defect portion, so that the sufficient polarization voltage cannot be applied to the composite piezoelectric material. In this case, in the present invention, since the unique polarizing step employing an auxiliary electrode that can tightly contact to the composite piezoelectric material up to a predetermined length is established, the defect can be sensed/avoided to stabilize the polarization, whereby the longer cord having a length of several tens meter can be attained.

Also, in the cable-like sensor, the coil-like metal core electrode is employed as the inner electrode and the film-like electrode (triple-layered laminate film consisting of aluminum-polyethylene terephthalate-aluminum) is employed as the outer electrode. Thus, not only the adhesion between the composite piezoelectric material and the electrodes is assured but also the outer lead wire is easily connected to the sensor, so that the flexible cable-like fitting structure can be obtained.

The core electrode is made of the copper-silver alloy coil, the outer electrode is made of the triple-layered laminate film consisting of aluminum-polyethylene terephthalate-aluminum, the piezoelectric material is made of the polyethylene resin +the piezoelectric ceramic powders, and the housing is made of the thermoplastic plastic. Thus, the relative dielectric constant is 55, an amount of generated charge is 10-13 C(coulomb)/gf, and the maximum operating temperature is 120° C.

FIGS. 5A and 5B show an extrusion head of this type in the conventional art, wherein FIG. 5A is a longitudinal sectional view and FIG. 5B is a side view. In FIGS. 5A and 5B, 50 is an extrusion head, 51 is a melt-coating composition pressure-feeding portion, 511 is a land portion, 512 is a cap nut, 52 is a die ring, 521 is a die holding ring, 522 is a thickness deviation adjusting bolt, 523 is a tap bolt, 53 is a nipple, 54 is a die block, 55 is a mandrel, 56 is a nipple holder, 561 is a wire guide, 562 is a thickness deviation adjusting ring, 563 is a gap adjusting nut, and 57 is a composition temperature sensor.

Next, an operation of this apparatus in the conventional art will be explained hereunder.

First, the core wire W is guided linearly from the wire guide 561 on the left side in FIG. 5A, then is moved linearly through passages in the mandrel 55 and the nipple 53 from there to the right side in FIG. 5A, and then is pulled out from an exit portion of the die ring 52.

Meanwhile, the composite piezoelectric material consisting of the piezoelectric ceramic powders and the synthetic rubber is supplied from the melt-coating composition pressure-feeding portion 51 shown at the top in FIG. 5A and is heated by a heating apparatus (not shown). Then, such material is fed through a passage of the land portion 511 and a passage (not shown) of the mandrel 55 and a clearance 541, which is formed between an inner surface of the die block 54 and outer surfaces of the nipple 53 and the nipple holder 56, by a pressure-feeding mechanism (not shown) such as a screw, or the like in the melted state. Then, such material is output from an exit portion of the die ring 52 while coating round the outer side of the core wire W at the front end of the nipple 53.

As can be understood from a sectional view of the die ring 52, the internal shape of the die ring 52 in the apparatus in the conventional art is shaped into a taper (funnel) shape that an inner diameter is narrowed with the progress in the proceeding direction to prevent the stagnation of the melt-coating composition. It is considered that, because of this funnel shape, the melt-coating composition can be pressure-fed smoothly without the stagnation in the hollow portion. Therefore, this funnel shape is assumed as the best shape up to now and thus other shapes except this shape are not suitable for the pressure-feeding of high viscous composition. In other words, everybody thinks of such a conclusion that, if this melt-coating composition is formed of not the high viscous composition but the low viscous composition or the fluid liquid, the internal shape of the die ring should not always be shaped into the taper shape and thus such melt-coating composition can be pressure-fed smoothly even when the internal shape of the die ring is shaped into the perpendicular wall, e.g., a syringe, to the proceeding direction. However, this taper shape is an indispensable major premise in the extruding apparatus that extrudes the high viscous (so-called hard) composition such as the material of the pressure-sensitive sensor, and this shape is a ultimate shape. The existing state is that other shapes except the taper shape are not taken into consideration at all in this technical field.

Then, it is considered that it takes a lot of time to pressure-feed the melt-coating composition since such composition is high viscous, nevertheless the coated core wire can be manufactured at a production speed of 1 m/min because the internal shape of the die ring is shaped into the taper shape.

By the way, the applicant of this application tried various experiments to increase the above production speed of 1 m/min.

Experiment 1: First, in the apparatus in the conventional art, when the number of revolution of the screw was increased up to three times or more (7 rpm) of the normal number of revolution (2 rpm), the melt-coating composition was not ejected from the exit portion of the die ring 52 but such composition was leaked from the flange.

Experiment 2: Then, in the apparatus in the conventional art, when the flange was clamped once again after the temperature rise and then the number of revolution of the screw was further increased up to two times or more (14 rpm), similarly the composition was leaked from the flange. The extrusion speed was 1.5 m/min. Then, if the number of revolution of the screw was further increased, the bolts of the flange were broken.

Experiment 3: In the apparatus in the conventional art, when the flange was clamped once again while using the convexly projected copper packing after the temperature rise and then the number of revolution of the screw was set to 2 rpm, the melt-coating composition was not ejected from the exit portion of the die ring 52 but such composition was leaked from the flange. The pressure sensor sensed about 60 MPa.

Experiment 4: In the apparatus in the conventional art, the number of revolution of the screw was set to 2 rpm while using the existing packing and the Teflon packing, the melt-coating composition was not ejected from the exit portion of the die ring 52 but such composition was leaked from the flange. The Teflon packing was also protruded. The pressure sensor sensed about 50 MPa.

Experiment 5: In the apparatus in the conventional art, when the clamping of the bolt is increased while using the convexly projected copper packing and the Teflon packing and the number of revolution of the screw was set to 4 rpm, the extrusion speed was 0.6 m/min and the melt-coating composition was not ejected from the exit portion of the die ring 52 in the middle. The pressure sensor sensed about 95 MPa. Then, if the number of revolution of the screw was further increased, the bolts were broken.

As described above, the production speed of 1 m/min is the upper limit, and leakage of the composition from the packing or breakage of the bolt is caused if the production speed is increased further more.

SUMMARY OF THE INVENTION

The present invention has been made to overcome these problems, and it is an object of the present invention to provided a cord-like coated core wire extruding apparatus that can be driven at a high speed not to cause leakage of the melt coating composition from a packing and breakage of the bolt.

In order to overcome the above subjects, an extrusion head of the present invention provides an extrusion head that comprises a die ring having an exit portion and a nipple arranged in vicinity of the exit portion, whereby a core wire passage is provided to an inside of the nipple in an axial direction, and a high viscous melt-coating composition is pressure-fed into a space, which is formed by the die ring and the nipple, toward the exit portion while drawing out a core wire from the core wire passage to the exit portion, and thus a cord-like coated core wire is extruded from the exit portion of the die ring while coating the core wire with the high viscous melt-coating composition, wherein a stagnation reservoir in which the high viscous melt-coating composition is stagnated is constructed in a space that is formed by the die ring and the nipple in vicinity of the exit portion.

According to the above structure, even though the melt-coating composition has the high viscosity, such composition can fed to the exit portion without the large surface frictional resistance, and thus the high-speed production can be achieved.

Also, in the extrusion head, the stagnation reservoir is constructed by forming a wall surface having the exit portion into a shape that is perpendicular or almost perpendicular to a proceeding direction of the core wire at the exit portion. According to the above structure, the stagnation reservoir having the simplest structure can be obtained.

Also, the stagnation reservoir is constructed by forming a wall surface having the exit portion into stepwise shapes on an oblique surface that becomes narrow along a proceeding direction of the core wire at the exit portion. According to the above structure, since the stagnation reservoir can be formed more quickly than the stagnation reservoir set forth in claim 3, the start of the operation is accelerated and thus the apparatus can be shifted quickly to the steady operation.

Also, the high viscous melt-coating composition is supplied to the die ring via a linear path. According to the above structure, the frictional resistance can be reduced rather than the conventional apparatus that supplies the melt-coating composition perpendicularly, and thus the production speed can be largely increased.

Also, a core wire passage in a nipple holder that fixes the nipple is formed as a linear path. According to the above structure, since the core wire can be arranged not to interference with the extruding apparatus and also the folded portion is eliminated from the core wire, the coating extrusion can be carried out without application of the unnecessary load.

Also, a core wire passage in a nipple holder that fixes the nipple is formed as a path that is perpendicular or oblique to the core wire passage in the nipple. According to the above structure, the sensor having the same advantages can be manufactured without complicated workings by which the core wire passage is formed in the inside of the uniaxial screw.

In addition, since the Wire coating extruding apparatus has such a structure that a flow of the melt-coating composition is supplied via a linear path until the melt-coating composition is coated on the core wire, a flow direction of the melt-coating composition is never bent and also the coating extrusion can be carried out while suppressing increase of the extrusion pressure. Thus, the generation of the drawbacks such as impossibility of the coating extrusion, leakage of the coating composition from the sealing plate, and failure of the extruder can be avoided. In particular, the coating extrusion of the core wire can be achieved successively by employing the screw-type extruder.

BRIEF DESCRIPTION OF THE DRAWINGS

FIGS. 1A and 1B are views showing an extrusion head according to a first embodiment of the present invention.

PREFERRED EMBODIMENT OF THE PRESENT INVENTION

Figure 2C:
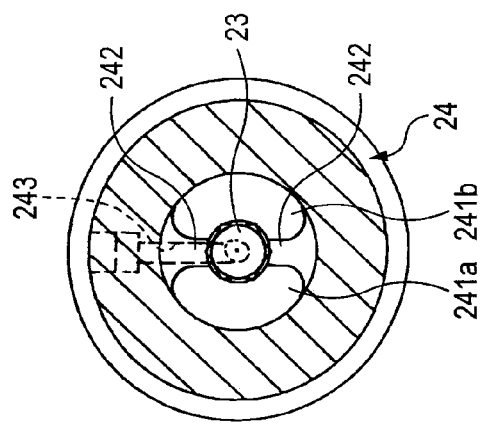
FIGS. 2A to 2D are views showing a nipple portion of the extrusion head according to a second embodiment of the present invention.
Figure 2B:
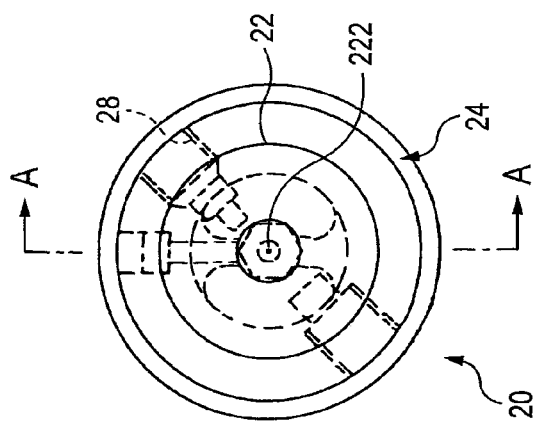

The present invention will be explained in detail with reference to FIGS. 1A to FIG. 4 hereinafter.

FIGS. 1A and 1B show an extrusion head according to a first embodiment of the present invention, wherein FIG. 1A is a front sectional view and FIG. 1B is a side sectional view. In FIGS. 1A and 1B, 10 is an extrusion head according to the first embodiment of the present invention, and a melt-coating composition pressure-feeding portion 11 on the left side in FIG. 1A and a die ring 12 on the right side in FIG. 1A are fixed to a die block 14 as a base, which has a through hole 141 in the longitudinal direction in FIG. 1A, via fixing members respectively.

The melt-coating composition pressure-feeding portion 11 is a tubular body in which a cylindrical space 111 is formed in the longitudinal direction, and is communicated with a through hole 141 of the die block 14 at the front end (the right side in FIG. 1A) in the proceeding direction. A uniaxial screw 16 that is used commonly as a nipple holder is inserted into this cylindrical space 111. A nipple 13 is fixed to the front end of the uniaxial screw 16 in the proceeding direction, and spiral vanes 164 are formed on the surface thereof. The melt-coating composition that is present in the cylindrical space 111 is fed forward (fed to the right side in FIG. 1A) by the revolution of the uniaxial screw 16. Also, according to the first embodiment of the present invention, a core wire passage 161 through which the core wire W is fed in its longitudinal direction is formed in the inside of the uniaxial screw 16.

An outer shape of the front end of the nipple 13, which is fixed to the front end of the uniaxial screw 16 in the proceeding direction, has a circular cone shape, and also an outer shape of the rear end thereof has a cylindrical shape. A core wire passage 131 through which the core wire W is fed in its longitudinal direction is formed in the inside of the nipple 13, and is communicated with the core wire passage 161.

The die ring 12 is formed as a cap-like shape that has a concave space 121 in its inside, and an exit portion 122 that is communicated with the concave space 121 and the outside is opened at the center in the axial direction. This exit portion 122 is arrange near the front end of the core wire passage 131 of the nipple 13.

Also, in FIG. 1A, a pressure sensor 18 and a resin temperature sensor 17 are fitted from top and bottom sides of the die block 14 toward the center to sense the pressure and the temperature of the melt-coating composition in the through hole 141 respectively.

An operation of the extrusion head 10 constructed as above will be given as follows.

The core wire is guided to the core wire passage 161, which is formed in the inside of the uniaxial screw 16, from the left side in FIG. 1A to move linearly in the core wire passage 161, then is fed through the core wire passage 131 of the nipple 13 to output from the opening portion of the nipple 13, and then is fed through the concave space 121 in the inside of the die ring 12 to output from the exit portion 122 of the die ring 12.

According to the above structure, since the core wire is guided to the core wire passage 161 in the inside of the uniaxial screw 16 to move linearly, the moving core wire W can be arranged without interference with the extruding apparatus. Also, since the folded portion can be eliminated from the core wire W, the coating extrusion can be carried out without application of the unnecessary load.

Meanwhile, the high viscous coating composition (the composite piezoelectric material consisting of the piezoelectric ceramic powders and the synthetic rubber) is fed into the cylindrical space 111 on the outside of the uniaxial screw 16 from the left side in FIG. 1A in its melt state that is obtained by heating such composition close to 100° C. by means of a heater heating apparatus (not shown) Because the uniaxial screw 16 is rotated in the cylindrical space 111, such coating composition is pressure-fed to the front side (right side) by the spiral vanes 164 formed on the surface of the uniaxial screw 16 and finally reaches the concave space 121 in the inside of the die ring 12. While coating the core wire W, which is output from the opening portion of the nipple 13, with such coating composition in the concave space 121, the cord-like coating core wire is pulled out from the exit portion 122 with keeping the core wire at the center position. In this manner, the linear pressure-feeding of the high viscous melt-coating composition cannot be attained by the apparatus in the prior art. In other words, since the melt-coating composition is perpendicularly supplied in the apparatus in the prior art, the frictional resistance of such composition in vicinity of the right angle is large. In contrast, since the high viscous melt-coating composition is linearly supplied in the present invention, the frictional resistance of such composition can be reduced and thus the high-speed pressure-feeding can be implemented.

Figure 5B:
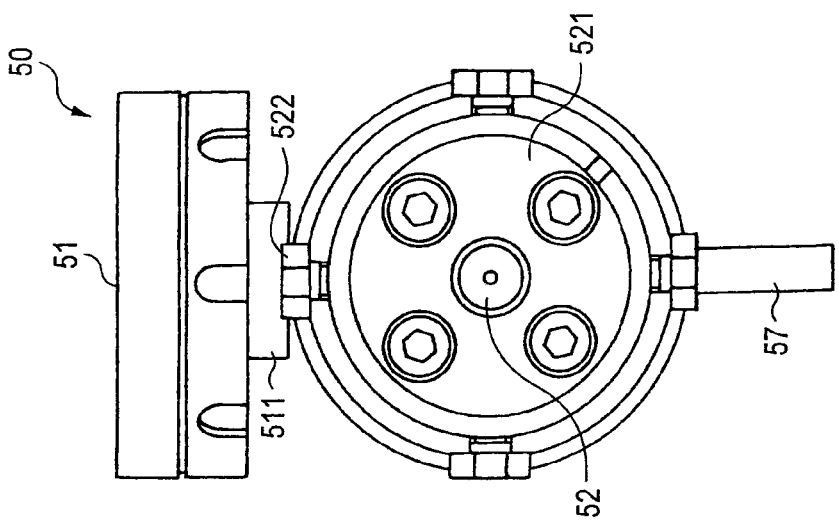
FIGS. 5A and 5B are views showing an extrusion head of this type in the prior art.
Figure 5A:
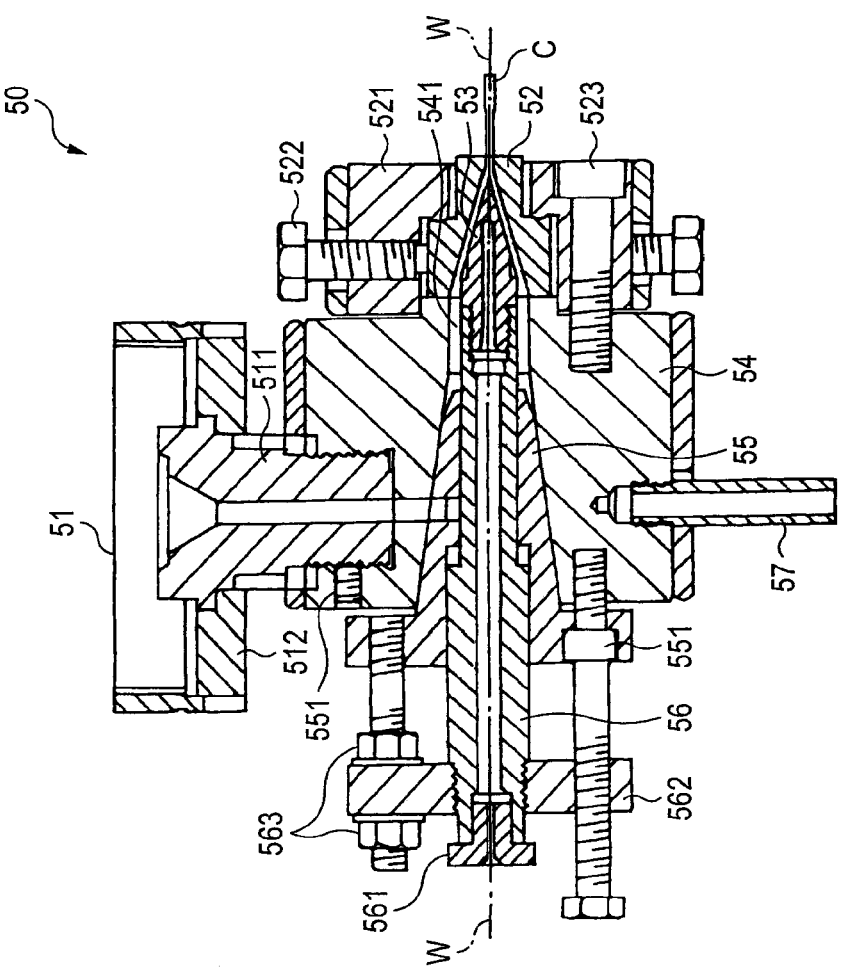

In addition, in the present invention, respective embodiments are characterized in that the wall surface containing the exit portion 122 of the die ring 12 is formed perpendicularly to the proceeding direction of the core wire W at the exit portion 122. As can be seen based on the comparison of this internal shape with the internal shape of the die ring 52 in the conventional apparatus in FIG. 5, a difference resides in that, in the apparatus in the prior art, the internal shape of the die ring 52 is shaped into the funnel shape that is narrowed with the proceed along the proceeding direction not to stagnate the melt-coating composition whereas, in the present invention, the internal shape of the die ring 12 is shaped to stagnate positively the melt-coating composition.

Since the wall surface containing the exit portion 122 is formed perpendicularly in this manner, the high viscous melt-coating composition that enters into the corner portion is brought into the state that such composition just enters into the "stagnation reservoir" in which such composition can move neither forward nor back. According to the applicant's present understanding, it is supposed that, if the internal shape of the die ring is shaped into the funnel shape, most part of the high viscous melt-coating composition that is to be fed toward the exit portion 122 is moved while contacting to the funnel surface, and thus the frictional resistance on the surface becomes large and the movement of such composition becomes slow. On the contrary, it is supposed that, if the internal shape of the die ring is shaped into the wall surface that extends perpendicularly to the proceeding direction of the core wire (present invention), the high viscous melt-coating composition that is to be fed toward the exit portion 122 does not contact to such wall surface but is moved while contacting to the same composition that still stagnates in the stagnation reservoir, and thus the friction is not so large and the high-speed movement of such composition can be attained.

In this connection, when this die ring 12 is compared with the die ring 52 in the extrusion head 50 (FIGS. 5A and 5B), the extrusion speed can be largely increased up to 5 m/min to 12 m/min rather than the extrusion speed of 1 m/min in the prior art.

Figures 3A, 3B, 3C, 3D, 3E:
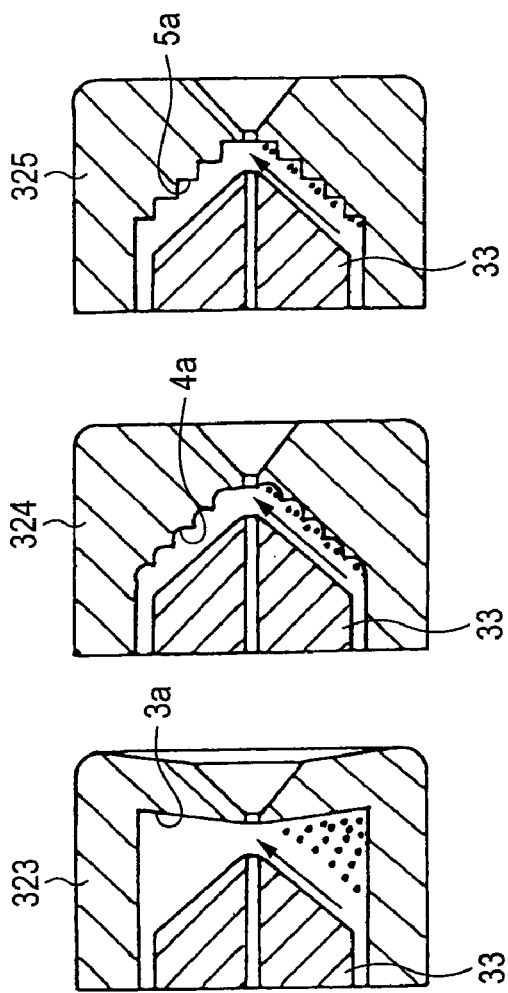
FIGS. 3A to 3E are views showing various structures of a stagnation reservoir formed in a die ring 32.
Figure 4:
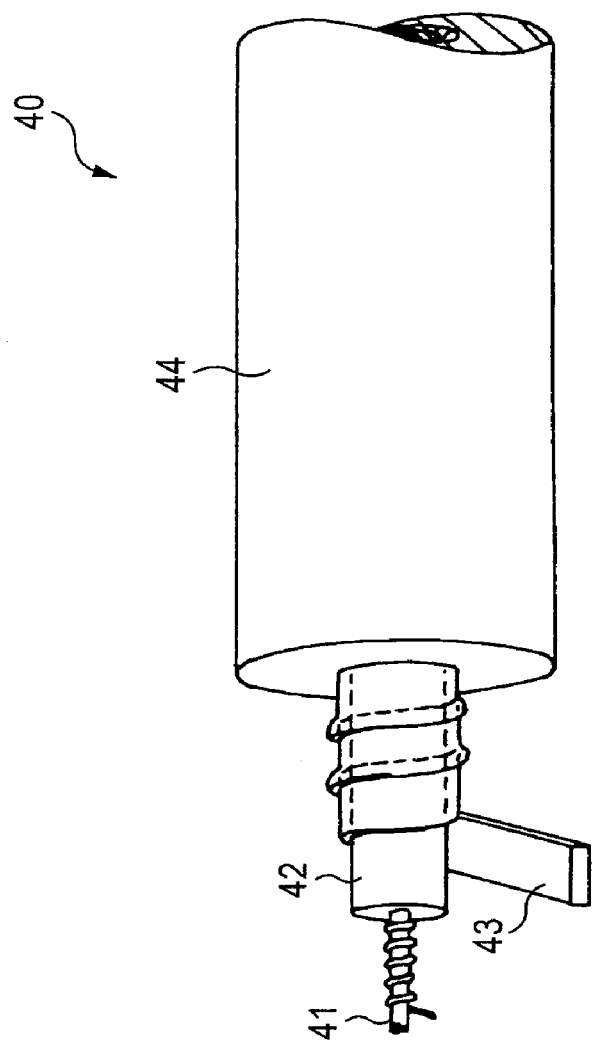
FIG. 4 is a structure of a cord-like pressure-sensitive sensor using a coated core wire as an object of the present invention.

FIGS. 3A to 3E show various structures of the stagnation reservoir formed in the die ring 32. FIGS. 3A to 3C show a pot type, wherein FIG. 3A is a right-angle type, FIG. 3B is a curved type, and FIG. 3C is an obtuse-angle type. FIGS. 3D and 3E show a colosseum (circular stadium) type, wherein FIG. 3D is a right-angle type and FIG. 3E is a curved type.

In a die ring 321 in FIG. 3A, since a wall surface 1a having the exit portion is formed perpendicularly to the proceeding direction of the core wire, the high viscous melt-coating composition that reaches the wall surface 1a is brought into the state that such composition enters into the so-called "stagnation reservoir" (portion indicated by a set of dots in FIG. 3A) in which such composition can move neither forward nor back. As a result, it is supposed that the high viscous melt-coating composition that is pressure-fed along the direction indicated by an arrow is not directed to the stagnation reservoir but such composition is moved toward the exit portion while contacting to the same composition being stagnated in the stagnation reservoir, and thus the high-speed movement of such composition can be achieved.

In a die ring 322 in FIG. 3B, since a wall surface 2a having the exit portion is formed as the curved shape, the "stagnation reservoir" (portion indicated by a set of dots in FIG. 3B) in which such composition stagnates more easily is formed. As a result, the high viscous melt-coating composition that is pressure-fed along the direction indicated by an arrow can be moved toward the exit portion at a high speed while contacting to the same composition in the stagnation reservoir.

In a die ring 323 in FIG. 3C, since a wall surface 3a having the exit portion is formed at an obtuse angle (inclined to the right side in FIG. 3C) to the proceeding direction of the core wire, the composition that reaches there is brought into the state that such composition enters into the "stagnation reservoir" (portion indicated by a set of dots in FIG. 3C) in which such composition is more difficult to move to the exit portion. As a result, it is supposed that the high viscous melt-coating composition that is pressure-fed along the direction indicated by an arrow is not directed to the stagnation reservoir but such composition is moved toward the exit portion while contacting to the same composition being stagnated in the stagnation reservoir, and thus the high-speed movement of such composition can be achieved.

In a die ring 324 in FIG. 3D, since a wall surface 4a having the exit portion is formed as a right-angle colosseum, the stagnation reservoir is formed more quickly than the stagnation reservoirs in FIG. 3A to FIG. 3C. Therefore, the start of the operation is accelerated and thus the apparatus can be shifted quickly to the steady operation.

In a die ring 325 in FIG. 3E, since a wall surface 5a having the exit portion is formed as a curved colosseum, the stagnation reservoir in which the composition is more difficult to move toward the exit portion rather than the stagnation reservoir in FIG. 3D is formed.

FIG. 2 shows a nipple portion of an extrusion head according to a second embodiment of the present invention. FIG. 2A is a A-A sectional view in FIG. 2B, FIG. 2B is a side view, FIG. 2C is a B-B sectional view in FIG. 2A, and FIG. 2D is a plan view.

Figure 2A:
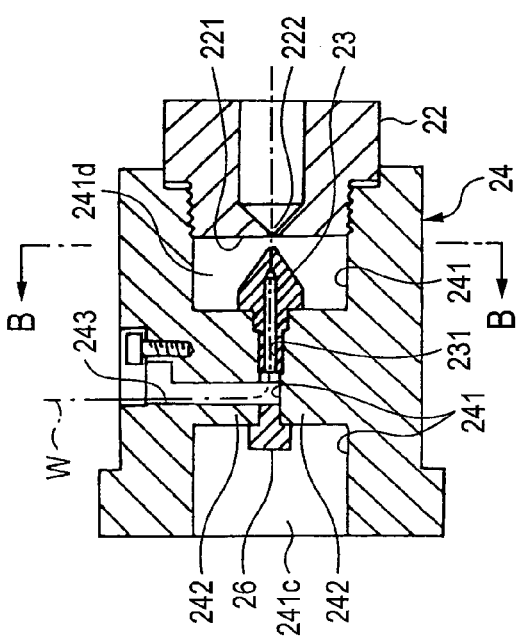
Figure 2D:
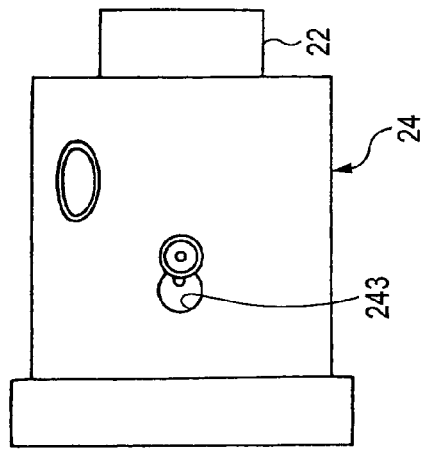

In FIG. 2A, 24 is a tubular die block that has a through hole 241 formed to pass through in the longitudinal direction. A die ring 22 is fixed to the right side of the die block 24, and the same uniaxial screw as explained in FIGS. 1A and 1B, although not shown, is positioned on the left side of the die block 24. The melt-coating composition is pressure-fed by the rotation of the screw.

A coupling portion 242 that passes through the center of the pipe to couple the walls of the pipes is provided near the center of the through hole 241 in the longitudinal direction. A nipple 23 is fixed to the right side of the coupling portion 242, and the left side of the coupling portion 242 is closed by a tap 26.

A width of the coupling portion 242 in the radial direction (see FIG. 4C) is formed narrowly. Therefore, since the through hole 241 has passages (241a, 241b in FIG. 2C) on both sides of the coupling portion 242, a passage 241c as a space to which the melt-coating composition comes up in FIG. 2A and a passage 241d as a space on the die ring side (both passages are present on the front side and the back side of this sheet in a bypath diagram 2C of the coupling portion 242) are communicated with each other. Thus, the melt-coating composition that reaches the left side of the die block 24 can be moved to the die ring 22 side.

The nipple 23 has a through hole 231 that passes through the center in the axial direction, and a hole provided in the radial direction to communicate with the through hole 231. A die block passage 243 that is communicated with the outside of the die block and the radial hole in the nipple 23 is provided to the coupling portion 242 of the die block 24. The core wire W is supplied to the through hole 231 of the nipple 23 from the outside via the die block passage 243 and the radial hole of the nipple 23, and then is output to the outside of the die ring 22 via an exit portion 222 of the die ring 22.

In this manner, a feature of the second embodiment of the present invention is that the core wire W is supplied perpendicularly to the nipple 23. According to this structure, the sensor having the same advantages can be manufactured without complicated workings by which the core wire passage 161 (FIGS. 1A and 1B) is formed in the inside of the uniaxial screw 16. In this case, the core wire W is supplied perpendicularly to the nipple 23 herein. But it is a matter of course that the core wire W may be supplied obliquely to the nipple 23.

Other features are similar to the first embodiment. In other words, the high viscous melt-coating composition is pressure-fed linearly, and also the stagnation reservoir is formed.

As described above, the linear pressure-feeding of the high viscous melt-coating composition is not implemented by the apparatus in the prior art. According to the present invention, since the high viscous melt-coating composition is pressure-fed linearly, the frictional resistance can be reduced and thus the high-speed pressure-feeding of such composition can be attained.

Also, the stagnation reservoir is formed as follows. The die ring 22 has a cap shape, and the exit portion 222 that is communicated with the outside is opened in a cap outer wall 221. Because the cap outer wall 221 having the exit portion 222 of the die ring 22 is formed perpendicularly to the proceeding direction of the core wire W at the exit portion 222, the stagnation reservoir is formed at the corner portion.

Then, this exit portion 222 is formed in vicinity of the top end of the through hole 231 of the nipple 23. Also, the pressure sensor and the resin temperature sensor, although not shown, are fitted to direct from the top and the bottom of the die block 24 to the center respectively to sense the pressure and the temperature of the melt-coating composition in the through hole 241.

An operation of the extrusion head in FIG. 2 as described above will be explained as follows.

The core wire W is supplied to the through hole 231 of the nipple from the passage 243 of the die block 24, and then is output to the outside of the die ring 22 via the exit portion 222 of the die ring 22. Meanwhile, the melt-coating composition is pressure-fed to the left side space 241c in the die block 24 in the melted state in which such composition is heated up to almost 100° C. by a heater heating apparatus (not shown), and then comes finally up to the right side space 241d in the die ring 12 via the bypaths 241a, 241b (FIG. 2C). Then, the cord-like coated wire having the core wire at its center is output from the exit portion 222 while coating the core wire W, which is fed from the nipple 23, with the composition in the right side space 241d in the die ring 12.

At that time, like the first embodiment, according to the "stagnation reservoir" of the present invention, the stagnation reservoir is formed at the corner portion because the wall portion of the die ring is formed perpendicularly to the proceeding direction of the core wire W. Therefore, since the composition that enters once into the corner portion can move neither forward nor backward, the high viscous melt-coating composition being pressure-fed cannot go to the stagnation reservoir and thus such composition moves toward the exit portion at a high speed while lightly contacting to the same composition being stagnated in the stagnation reservoir. The production speed according to the second embodiment of the present invention becomes 5 m/min to 12 m/min, and thus the speed-up can be largely achieved in contrast to the apparatus in the prior art.

As described above, according to the present invention, there is provided an extruding apparatus that comprises a die ring having an exit portion and a nipple arranged in vicinity of the exit portion, whereby a core wire passage is provided to an inside of the nipple in an axial direction, and a high viscous melt-coating composition is pressure-fed into a space, which is formed by the die ring and the nipple, toward the exit portion while drawing out a core wire from the core wire passage to the exit portion, and thus a cord-like coated core wire is extruded from the exit portion of the die ring while coating the core wire with the high viscous melt-coating composition, wherein a stagnation reservoir in which the high viscous melt-coating composition is stagnated is constructed in a space that is formed by the die ring and the nipple in vicinity of the exit portion. Therefore, even though the melt-coating composition has the high viscosity, such composition can fed to the exit portion without the large surface frictional resistance. Thus, the high-speed production can be achieved.

Also, the high viscous melt-coating composition is supplied to the die ring via the linear paths. Therefore, the frictional resistance can be reduced rather than the conventional apparatus that supplies the melt-coating composition perpendicularly, and thus the production speed can be largely increased.

The invention claimed is:

1. An extrusion head comprising: a die ring having an exit portion and a nipple arranged in vicinity of the exit portion, whereby a core wire passage is provided to an inside of the nipple in an axial direction, and a high viscous melt-coating composition is pressure-fed into a space, which is formed by the die ring and the nipple, toward the exit portion while drawing out a core wire from the core wire passage to the exit portion, and thus a cord-like coated core wire is extruded from the exit portion of the die ring while coating the core wire with the high viscous melt-coating composition, wherein a stagnation reservoir in which the high viscous melt-coating composition is stagnated is constructed in the space that is formed by the die ring and the nipple in vicinity of the exit portion, and wherein the stagnation reservoir is constructed by forming a wall surface of the exit portion into stepwise shapes on an oblique surface that becomes narrow along a proceeding direction of the core wire at the exit portion.

2. An extrusion head according to claim 1, wherein the high viscous melt-coating composition is supplied to the die ring via a linear path.

3. An extrusion head according to claim 1, wherein a core wire passage in a nipple holder that fixes the nipple is formed as a linear path.

4. An extrusion head comprising: a die ring having an exit portion and a nipple arranged in vicinity of the exit portion, whereby a core wire passage is provided to an inside of the nipple in an axial direction, and a high viscous melt-coating composition is pressure-fed into a space, which is formed by the die ring and the nipple, toward the exit portion while drawing out a core wire from the core wire passage to the exit portion, and thus a cord-like coated core wire is extruded from the exit portion of the die ring while coating the core wire with the high viscous melt-coating composition, wherein a stagnation reservoir in which the high viscous melt-coating composition is stagnated is constructed in the space that is formed by the die ring and the nipple in vicinity of the exit portion, and wherein a core wire passage in a nipple holder that fixes the nipple is formed as a path that is perpendicular or oblique to the core wire passage in the nipple.

* * * * *